Feb. 17, 1959
R. E. HOHMAN
2,873,701
FLUID FUEL BURNER
Filed Aug. 4, 1955
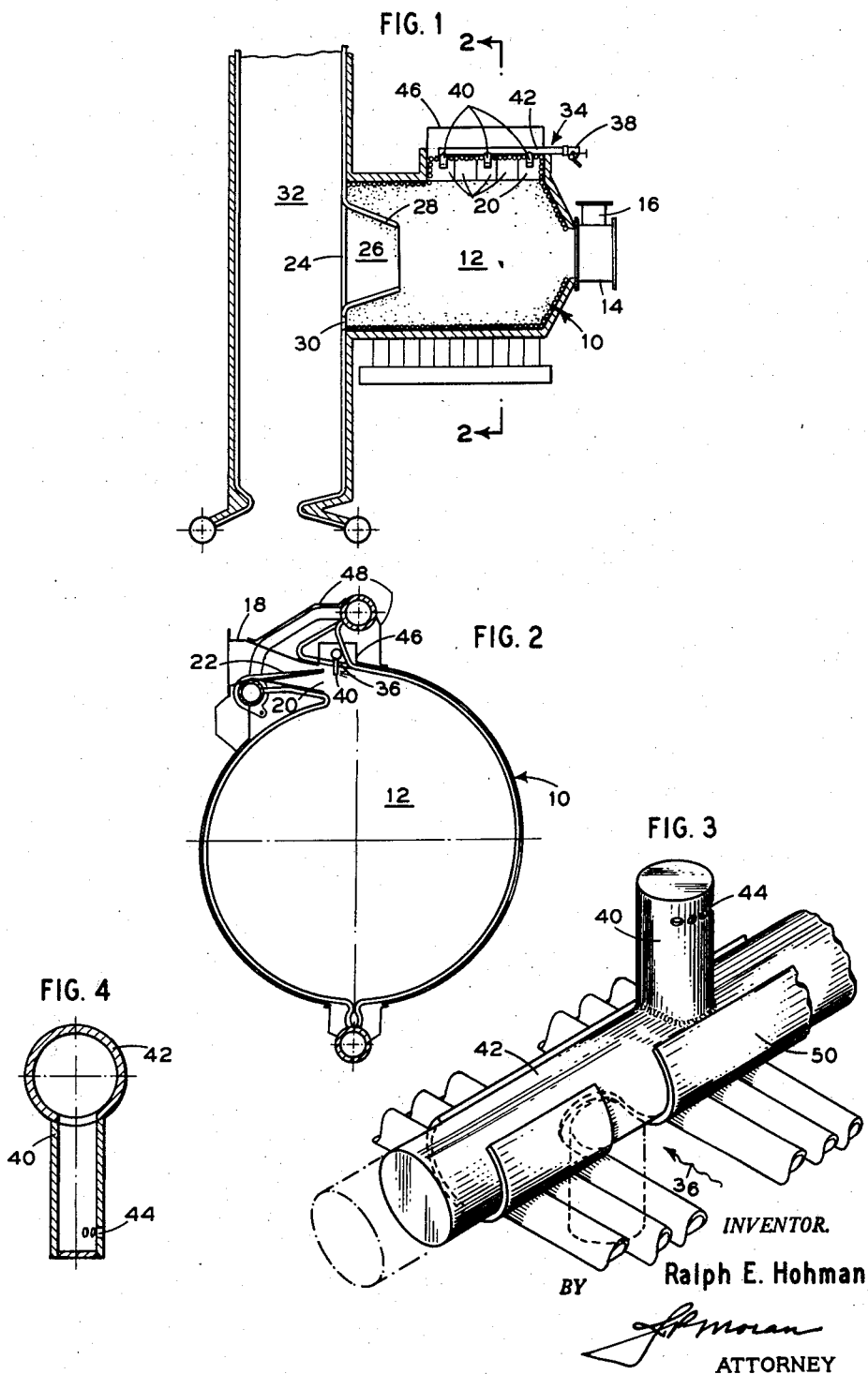
INVENTOR.
Ralph E. Hohman
BY
ATTORNEY

United States Patent Office 2,873,701
Patented Feb. 17, 1959

2,873,701

FLUID FUEL BURNER

Ralph E. Hohman, Morristown, N. J., assignor to The Babcock & Wilcox Company, New York, N. Y., a corporation of New Jersey Application August 4, 1955, Serial No. 526,408

8 Claims. (Cl. 110—28)

The present invention relates in general to apparatus for burning fluid fuel in a furnace of circular cross-section having a concentric gas outlet at one end and designed for the burning of a particle form slag-forming solid fuel, such furnaces being known in the art as cyclone furnaces. The invention features a novel form of fluid fuel burner particularly suited for installation with cyclone furnaces utilizing a fuel or fuels of different character. The invention is especially adapted for use in cyclone furnace installations having provisions for burning a crushed fuel for a given period of time and requiring provision for burning a fluid fuel separately or in combination with a crushed fuel for another period. In some instances where crushed fuel is normally used in a cyclone furnace, the supply of such fuel may at times be inadequate, totally unavailable or relatively costly, in which situations it is desirable to provide means for burning an auxiliary or alternate fuel, such as oil or gas, in order to maintain the desired heat input into the furnace.

The cyclone furnace was developed primarily to burn coarsely pulverized or granulated slag forming solid fuels. In the normal operation of a cyclone furnace the crushed fuel, carried in a stream of preheated primary air constituting 15 to 25% of the total air for combustion, is introduced tangentially to a cylindrical primary burner at one end of the furnace, and, to complete the combustion, secondary air constituting 75 to 85% of the total air for combustion is introduced tangentially to the circumferential wall of the cyclone furnace in the same direction of rotation as the primary air and fuel. The entering fuel and primary air streams are rapidly ignited and the centrifugal effect of the whirling stream causes the ash particles released from the burning fuel particles to deposit in a molten condition on the furnace wall and form a film or layer of molten slag thereon on which the larger fuel particles are caught and burned in place. The incombustible ash residue is discharged in a molten stream through a slag outlet located in the lower part of the cyclone furnace and the gaseous products of combustion are discharged from the furnace chamber through the concentric gas outlet. Cyclone furnaces of this type are disclosed in U. S. Patent No. 2,594,312.

Gas and liquid fuels are highly suited for cyclone furnace firing and can be burned at ratings and performances equal to those for crushed coal firing. Heretofore, when firing liquid fuel in a cyclone furnace, the practice has been to inject the liquid fuel into the secondary air stream by means of an elongated orificed pipe extending transversely of the secondary air ports. With such an arrangement the liquid fuel is picked up and atomized by the high velocity secondary air. While satisfactory fuel and air mixing has been obtained with the burner apparatus so arranged, some difficulty has been experienced with deterioration and warping of the orificed pipe resulting from its continued exposure to the radiant heat of the furnace.

The present invention avoids the foregoing difficulty by providing for a special location and construction of the fuel supply assembly. In particular, the present invention provides a supply assembly arranged to supply fluid fuel through the circumferential wall of and into the combustion chamber. The fuel supply assembly includes a rotatable and retractable supply pipe having a plurality of longitudinally disposed fuel nozzle members extending at an angle to the supply pipe and arranged upon rotation of the supply pipe to operating position to project into the combustion chamber through the circumferential wall thereof, each nozzle having an orifice or orifices arranged to discharge fluid fuel into the combustion chamber in mixing relationship with a supply of combustion air, and supply pipe support means arranged to permit retraction and insertion of the supply pipe and to allow it to be manually turned from a fuel nozzle operative position within to a fuel nozzle inoperative position outside of the combustion chamber. With this arrangement the fuel supply pipe is effectively shielded from the radiant heat of the furnace by the fluid cooled tubes defining the circumferential wall of the combustion chamber, thus avoiding warpage and deterioration, and is available for immediate standby use at all times.

While the fuel supply assembly illustrated and hereinafter described is particularly adapted for burning a liquid fuel such as oil, it can also be used for the burning of gaseous fuels.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a preferred embodiment of the invention is illustrated and described.

Of the drawings:

Fig. 1 is a somewhat diagrammatic sectional elevation of a horizontally arranged cyclone furnace constructed and operable in accordance with my invention, and an associated water tube steam boiler;

Fig. 2 is a vertical section of the cyclone furnace taken on the line 2—2 of Fig. 1;

Fig. 3 is a perspective view showing a fuel supply pipe support and a fuel nozzle in operative and inoperative positions; and Fig. 4 is an enlarged end view, partly in section, of the fuel supply assembly.

As illustrated in the drawing, the cyclone furnace 10 is of horizontally elongated substantially circular cross-section with its major axis arranged substantially horizontal. The furnace chamber 12 is defined by closely spaced studded tubes covered by a layer of suitable refractory, as generally disclosed in U. S. Patent No. 2,594,312. Primary air is introduced tangentially into a primary burner 14 through a conduit 16. The primary burner 14, centrally located at the outer end of the cyclone furnace, imparts a whirling motion to the primary air as it enters the furnace chamber. The secondary air supply comprises a duct 18 connected to a suitable source of air under pressure and opening to a series of side by side secondary air inlets 20. The secondary air inlets 20 are provided with pivoted dampers 22 operable to control the velocity of the secondary air streams while maintaining the entering air streams at all times along the furnace chamber wall. The inlets 20 are tangentially arranged with respect to the furnace chamber 12 along a major portion of the furnace chamber length.

The rear end of the furnace is partly closed by a vertical fluid cooled wall 24 having a gas outlet 26 in the form of a re-entrant throat 28 arranged therein concentric with the furnace chamber axis. Below the throat 28 a slag outlet 30 is formed in the wall 24 for the discharge of molten slag when a slag forming fuel is fired in the furnace. The wall 24 forms part of the fluid cooled boundary walls of an associated vapor generating unit having a vertically elongated radiant chamber 32 which includes a lower or slag collecting section and an upper or gas cooling section.

Heretofore, when it has been desired to burn a liquid fuel and a slag-forming granular solid fuel separately or together, in a cyclone furnace of the character described, it has been the practice to introduce the granular fuel and primary air through the primary burner 14 and the liquid fuel through an orificed pipe extending transversely of the secondary air inlets 20.

While a liquid fuel and crushed fuel can be burned together in the cyclone furnace, the construction illustrated is particularly adapted for burning a liquid fuel alone. In accordance with the present invention a fuel supply assembly 34 is disposed longitudinally of and parallel to the axis of the combustion chamber and is arranged to supply liquid fuel into the combustion chamber through nozzle ports 36 situated superjacent the secondary fuel inlets 20 at spaced positions along the length of the furnace and formed by suitably bending adjacent pairs of furnace circumferential wall tubes. The fuel supply assembly 34 comprises a fuel supply head 38 of well known construction on its outer end and a plurality of radially projecting longitudinally spaced fuel nozzles 40 arranged in alignment along the length of a fuel supply pipe 42, each nozzle extending through a corresponding nozzle port into the combustion chamber when the fuel supply pipe is in its operative position. Each nozzle is provided with a multiplicity of circumferentially spaced orifices 44 arranged to spray liquid fuel into the combustion chamber adjacent the circumferential wall thereof and preferably in a direction parallel to and in the same direction as the secondary air flow path.

A housing 46, suitably secured to adjacent furnace fluid cooling tubes, is arranged about a portion of the fuel supply assembly to prevent fuel vapor accumulation in the cavity bounded by casing 48.

The front end of the housing 46 supports a hub member, not shown, through which the supply pipe 42 extends. As shown in Fig. 3, the supply pipe 42 is mounted within supports 50 suitably connected as by welding to adjacent furnace circumferential wall tubes and arranged to allow the fuel supply assembly to be rotated from a fuel nozzle operative position within (shown in dotted lines) to a fuel nozzle inoperative position outside of the combustion chamber and to permit retraction and insertion of the fuel supply assembly. Thus a slot extending the full length of each support allows longitudinal movement of the fuel supply assembly and a slot extending transversely of the longitudinal axis of the support member and over a portion of the circumference thereof allows the fuel supply assembly to be rotated.

While the described position of the fuel supply assembly and the relative arrangement of the parts thereof is to be preferred, the invention in its broader aspects may be carried out with the fuel supply pipe arranged to supply fuel through the circumferential wall of and into the combustion chamber at positions other than described; with fuel nozzles arranged to project within the combustion chamber in planes other than perpendicular to the longitudinal axis of the supply pipe; and with support members suitably adapted to permit longitudinal and rotational movement of the fuel supply pipe.

In the operation of the described burner, the streams of high velocity secondary air discharging from the secondary air ports enter the furnace chamber in the same angular direction as the direction of rotation and at the outer side of the whirling stream of primary air discharging into the furnace chamber from the primary burner 14. With the secondary air streams entering the furnace chamber as described, there will be atomization of the liquid fuel jets discharging from the orifices 44 and mixing of the secondary air streams and the liquid fuel. Combustion of the liquid fuel will progress at a high rate and there will be a gradual mixing of the burning streams of secondary air and liquid fuel with the enclosed stream of primary air to complete combustion of the fuel. The high velocity of the burning fuel and air causes the gas stream to follow a helical path toward the rear of the furnace where the gas reverses direction before entering the concentric gas outlet. From the gas outlet 26 the gases discharge into the lower section of the radiant chamber 32. The gases leave the chamber 32 at its upper end and contact with convection heated fluid heating tubes (not shown) of the vapor generator.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A cyclone furnace having walls defining a combustion chamber of substantially circular cross-section, fluid cooling means for said walls, a restricted gas outlet in one end of said combustion chamber, means for introducing combustion air in a longitudinally extending stream tangentially to the circumferential wall of said combustion chamber, a series of longitudinally spaced nozzle ports extending through the circumferential wall of said combustion chamber, a fluid fuel supply assembly including a supply pipe having a plurality of longitudinally spaced fuel nozzles arranged to project through said nozzle ports into said chamber, each of said nozzles having an orifice arranged to discharge fluid fuel into said chamber tangentially to the circumferential wall thereof, and means for supporting said supply pipe constructed and arranged to allow said nozzles to be rotated from a fuel nozzle operative position within to a fuel nozzle inoperative position outside of said combustion chamber and to allow retraction and insertion of said supply pipe.

2. A cyclone furnace having walls defining a combustion chamber of substantially circular cross-section, fluid cooling means for said walls, a restricted gas outlet in one end of said combustion chamber, an axially elongated combustion air inlet arranged tangentially of the circumferential wall of said combustion chamber between the chamber gas outlet end and the opposite end of said chamber, a series of longitudinally spaced and aligned nozzle ports disposed superjacent said air inlet and extending through the circumferential wall of said combustion chamber, a fluid fuel supply assembly including a supply pipe having a plurality of longitudinally spaced fuel nozzles arranged to project through said nozzle ports into said chamber, each of said nozzles having an orifice arranged to discharge fluid fuel into said chamber tangentially to the circumferential wall thereof, and means for supporting said supply pipe, constructed and arranged to allow said nozzles to be rotated from a fuel nozzle operative position within to a fuel nozzle inoperative position outside of said combustion chamber and to allow retraction and insertion of said supply pipe.

3. A cyclone furnace having walls defining a combustion chamber of substantially circular cross-section, fluid cooling means for said walls, a restricted gas oulet in one end of said combustion chamber, an axially elongated combustion air inlet arranged tangentially of the circumferential wall of said combustion chamber between the chamber gas outlet end and the opposite end of said chamber, a series of longitudinally spaced and aligned nozzel ports disposed superjacent said air inlet and extending through the circumferential wall of said combustion chamber, a fluid fuel supply assembly including a supply pipe having a plurality of longitudinally spaced fuel nozzles arranged to project through said nozzle ports into said chamber, each of said nozzles having an orifice arranged to discharge fluid fuel into said chamber tangentially to the circumferential wall thereof in a direction parallel to and in the same direction as the combustion air flow, and means for supporting said supply pipe constructed and arranged to allow said nozzles to be rotated from a fuel nozzle operative position within to a fuel nozzle inoperative position outside of said combustion chamber and to allow retraction and insertion of said supply pipe.

4. A cyclone furnace having walls defining a combustion chamber of substantially circular cross-section, fluid cooling means for said walls, a restricted gas outlet in one end of said combustion chamber, means for introducing a stream of primary air into the opposite end of said chamber, an axially elongated secondary air inlet arranged tangentially of the circumferential wall of said combustion chamber between the chamber gas outlet end and the opposite end of said chamber, a series of longitudinally spaced and aligned nozzle ports disposed superjacent said secondary air inlet and extending through the circumferential wall of said combustion chamber, a fluid fuel supply assembly including a supply pipe having a plurality of longitudinally spaced fuel nozzles arranged to project through said nozzle ports into said chamber, each of said nozzles having an orifice arranged to discharge fluid fuel into said chamber tangentially to the circumferential wall thereof in a direction parallel to and in the same direction as the secondary air flow, and supply pipe support means arranged to allow said nozzles to be rotated from a fuel nozzle operative position within to a fuel nozzle inoperative position outside of said combustion chamber and to allow retraction and insertion of said supply pipe.

5. A cyclone furnace having walls defining a combustion chamber of substantially circular cross-section, fluid cooled tubes for said walls, a restricted gas outlet in one end of said combustion chamber, means for introducing combustion air into said combustion chamber and effecting a whirling path of travel therein along the circumferential wall of said combustion chamber, a plurality of longitudinally spaced nozzle ports extending through the circumferential wall of said combustion chamber, a fluid fuel supply assembly including a supply pipe having a plurality of longitudinally spaced nozzles each arranged to project through a corresponding nozzle port into said chamber and to discharge fluid fuel into said chamber adjacent the circumferential wall thereof, and means for supporting said supply pipe, while permitting rotation and retraction thereof.

6. A cyclone furnace having walls defining a combustion chamber of substantially circular cross-section, fluid cooled tubes for said walls, a restricted gas outlet in one end of said combustion chamber, means for introducing combustion air into said combustion chamber and effecting a whirling path of travel therein along the circumferential wall of said combustion chamber, a plurality of longitudinally spaced nozzle ports extending through the circumferential wall of said combustion chamber, a fluid fuel supply assembly including a supply pipe having a plurality of longitudinally spaced fuel nozzles each arranged to project through a corresponding nozzle port into said chamber and to discharge fluid fuel into said chamber tangentially to the circumferential wall thereof, and means for supporting said supply pipe constructed and arranged to allow said nozzles to be rotated from a fuel nozzle operative position within to a fuel nozzle inoperative position outside of said combustion chamber and to allow retraction and insertion of said supply pipe.

7. A cyclone furnace having walls defining a combustion chamber of substanitally circular cross-section, fluid cooled tubes for said walls, a gas outlet in one end of said combustion chamber, means for introducing combustion air into said combustion chamber and effecting a whirling path of travel therein along the circumferential wall of said combustion chamber, a plurality of longitudinally spaced ports extending through the circumferential wall of said combustion chamber, a fluid fuel supply assembly including a supply pipe having a plurality of longitudinally spaced fuel nozzles each arranged to project through a corresponding nozzle port into said chamber and to discharge fluid fuel into said chamber tangentially to the circumferential wall thereof in the same direction as the combustion air flow, and means for supporting said supply pipe constructed and arranged to allow said nozzles to be rotated from a fuel nozzle operative position within to a fuel nozzle inoperative position outside of said combustion chamber and to allow retraction and insertion of said supply pipe.

8. A cyclone furnace having walls defining a combustion chamber of substantially circular cross-section, fluid cooling means for said walls, a restricted gas outlet in one end of said combustion chamber, an axially elongated combustion air inlet arranged tangentially of the circumferential wall of said combustion chamber between the gas outlet end of said combustion chamber and the opposite end of said chamber, a series of longitudinally spaced and aligned nozzle ports disposed superjacent said air inlet and extending through the circumferential wall of said combustion chamber, a fluid fuel supply assembly including a supply pipe having a plurality of longitudinally spaced fuel nozzles each arranged to project through a corresponding nozzle port into said chamber to discharge fluid fuel into said chamber tangentially to the circumferential wall thereof, and means for supporting said supply pipe, while permitting rotation and retraction thereof.

References Cited in the file of this patent

UNITED STATES PATENTS

| 1,068,872 | Eichoff | July 29, 1913 |
| 1,129,713 | Nikola | Feb. 23, 1915 |
| 1,142,928 | Bright | June 15, 1915 |
| 1,183,478 | Mathias et al. | May 16, 1916 |
| 1,936,499 | Couter | Nov. 21, 1933 |
| 2,103,605 | Zink | Dec. 28, 1937 |
| 2,464,791 | Bonvillian et al. | Mar. 22, 1949 |

FOREIGN PATENTS

| 1,025,395 | France | Jan. 21, 1953 |
| 3,863 | Great Britain | Mar. 13, 1888 |